(12) United States Patent
Ishii et al.

(10) Patent No.: US 8,971,234 B2
(45) Date of Patent: Mar. 3, 2015

(54) RADIO SYSTEM AND RADIO COMMUNICATION METHOD

(75) Inventors: Hirotake Ishii, Yokohama (JP); Yasutaka Morinaga, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 13/312,563

(22) Filed: Dec. 6, 2011

(65) Prior Publication Data

US 2012/0176955 A1 Jul. 12, 2012

(30) Foreign Application Priority Data

Jan. 6, 2011 (JP) .................. 2011-001437

(51) Int. Cl.
*H04B 7/14* (2006.01)
*H04W 72/04* (2009.01)
*H04W 24/10* (2009.01)
*H04W 72/00* (2009.01)
*H04W 72/08* (2009.01)
*H04W 84/04* (2009.01)

(52) U.S. Cl.
CPC ............ *H04W 72/042* (2013.01); *H04W 24/10* (2013.01); *H04W 72/005* (2013.01); *H04W 72/082* (2013.01); *H04W 84/047* (2013.01); *H04W 84/045* (2013.01)
USPC ....................................................... 370/315

(58) Field of Classification Search
CPC ... H04B 7/2606; H04B 7/1555; H04W 88/04; H04W 16/26; H04W 84/047
USPC .................. 370/315, 310, 274, 351
See application file for complete search history.

(56) References Cited

U.S. PATENT DOCUMENTS

| 2009/0296739 A1* | 12/2009 | Sakai et al. ................... 370/474 |
| 2010/0097965 A1* | 4/2010 | Kwon et al. .................. 370/294 |
| 2012/0224497 A1* | 9/2012 | Lindoff et al. ................ 370/252 |
| 2013/0053048 A1* | 2/2013 | Garcia et al. .................. 455/450 |

FOREIGN PATENT DOCUMENTS

| JP | 2009-117985 | 5/2009 |
| WO | WO 2010/049120 A1 | 5/2010 |

OTHER PUBLICATIONS

Hirotake Ishii, Radio system and radio communiation method, Dec. 6, 2011, Applicant Admitted Art (instant specification in the background section).*

(Continued)

*Primary Examiner* — Andrew Lai
*Assistant Examiner* — Zhiren Qin
(74) *Attorney, Agent, or Firm* — Foley & Lardner LLP

(57) ABSTRACT

Regardless of use of small resource in donor (macro) base station, high throughput in relay femto base station is provided. The relay femto base station transfers data of a C-plane communicated between a core network and a mobile station through the donor macro base station by a radio link, and transfers data of a U-plane through an internet by a wired public line. The relay femto base station measures an interfered power from a neighboring relay femto base station, and notifies the donor macro base station of the measured interfered power, and the donor macro base station adjusts radio packet scheduling so as to prevent interference between the relay femto base stations on the basis of a notified measurement value of the interfered power.

14 Claims, 9 Drawing Sheets

(56) References Cited

OTHER PUBLICATIONS

3rd Generation Partnership Project; Technical Specification Group Radio Access Network; Evolved Universal Terrestrial Radio Access (E-UTEA); Base Station (BS) radio transmission and reception (Release 9); 3GPP TS 36.104 V.9.4.0 (Jun. 2010); pp. 1-4, 16-19.

3rd GenerationPartnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 10); 3GPP TS 36.300 V.10.0.0 (Jun. 2010); pp. 1-4, 25-30.

3rd Generation Partnership Project; Technical Specification Group Radio Access Network; Feasibility study for Further Advancements for E-UTRA (LTE-Advanced) (Release 9); 3GPP TR 36.912 V.9.3.0 (Jun. 2010); pp. 1-2, 17-20.

Japan Patent Office Notification of Reasons for Refusal on application 2011-001437 mailed Feb. 18, 2014; pp. 1-2.

\* cited by examiner

| INTERFERED ID | INTERFERING ID |
|---|---|
| 1 | 3, 5, 6, 8 |
| 2 | 1, 3, 5 |
| 3 | 2, 1, 4 |
| 4 | 1, 3, 6 |
| 5 | 1, 2, 7 |
| 6 | 1, 3, 8 |
| 7 | 1, 5, 8 |
| 8 | 1, 7, 9 |
| 9 | 1, 6, 8 |

FIG.9

RADIO SYSTEM AND RADIO COMMUNICATION METHOD

CLAIM OF PRIORITY

The present application claims priority from Japanese patent application JP 2011-001437 filed on Jan. 6, 2011, the content of which is hereby incorporated by reference into this application.

BACKGROUND OF THE INVENTION

1. Field of the Invention

The present invention relates to a radio system and a radio communication method, and more particularly to a radio system and a radio communication method which transmit and receive a radio signal between a mobile station and a donor base station and/or a relay base station.

2. Background Art

In recent years, a service area of cellular phones is enlarged, and there are a large number of operators that exceed 99% in population coverage in Japan.

However, a status of indoor area maintenances such as underground cities or tall buildings will be still insufficient.

Because the indoor area maintenance is technically difficult, and expensive, in fact, the area maintenance is difficult.

The indoor population coverage largely falls below the above population coverage.

On the other hand, according to data, a frequency at which users use the cellular phones indoor exceeds 70% of the total, and complaints from the users have a higher proportion of contents related to the indoor service area.

At present, as one of indoor area maintenance countermeasures, there is a femto base station.

The femto base station is an ultraminiature base station that can be installed inside homes or offices, and features of the femto base station reside in that the output is low, the capacity is low, and the price is low. This femto base station is rapidly popularized domestically and internationally.

Another feature of the femto base station resides in that an internet can be connected as a backhaul.

A femto base station of long term evolution (LTE) is disclosed in 3GPP TS36.104 V9.4.0 (pages 16 to 19).

The femto base station of the LTE is called "home evolution node B (HeNB) or home base station (HomeBS) in a 3GPP.

The femto base station can be connected to the internet, and therefore has such an advantage that the femto base station can be easily installed within homes or offices.

On the other hand, as a base station proposed to facilitate the installation of the base station as a first purpose, there is a relay base station.

The details of the relay base station are disclosed in 3GPP TS36.300 V10.0.0 (pages 25 to 30) and 3GPP TR36.912 V9.3.0 (pages 17 to 20).

FIG. 1 is a diagram illustrating a configuration of a relay radio system according to a conventional example.

Hereinafter, an outline of the relay radio system using the 3GPP will be described with reference to the drawings.

In the 3GPP, the relay radio system is classified into a TYPE 1 and a TYPE 2, and in this example, a mode using an inband in the TYPE 1 will be described.

The relay radio system of the 3GPP includes a donor base station 501, a donor cell 502, a mobile station 503, a relay base station 504, a relay cell 505, a mobile station 506, and a core network 507.

The donor base station 501 forms the donor cell 502, and the relay base station 504 forms the relay cell 505.

The conventional relay base station 504 is frequently located within a communication area of the donor cell 502 formed by the donor base station 501, and particularly arranged at a cell edge of the donor cell 502.

It is assumed that the mobile station 503 is located within the communication area of the donor cell 502 formed by the donor base station 501, and the mobile station 506 is located in the relay cell 505 formed by the relay base station 504.

It is assumed that the donor base station 501 communicates with the mobile station 503 and the relay base station 504, and the relay base station 504 communicates with the mobile station 506.

The donor base station 501 is connected to the core network 507 with the aid of a backhaul connection of an operator dedicated line by wire.

The relay base station 504 has a function of transferring data of control (C)-plane and user (U)-plane communicated between the core network 507 and the mobile station 506 through the donor base station 501 by a radio link.

The data of C-plane communicated between the core network 507 and the mobile station 506 means control data such as transmission or reception.

The data of U-plane communicated between the core network 507 and the mobile station 506 means real user data.

Data transfer between the donor base station 501 and the relay base station 504 is conducted by using a given specific sub-frame.

FIG. 2 is a diagram illustrating an appearance of the data transfer in the conventional example. FIG. 2 illustrates the appearance of the data transfer among the donor base station 501, the relay base station 504, and the mobile station 506.

The donor base station 501 receives downlink data of the C-plane and the U-plane transmitted from the core network 507 through a backhaul connection 508, and subjects the downlink data to signal processing of each layer to obtain a downlink transmission signal Down Link (DL)-TXd.

The donor base station 501 transmits the downlink transmission signal DL-TXd with the aid of a multicast broadcast over single-frequency network (MBSFN) sub-frame.

In the present specification, the sub-frame means a data interval having a given period, for example, 1 [ms], and the MBSFN sub-frame means each specific sub-frame which is inserted into a given number of sub-frame intervals, for example, 10 sub-frames.

FIG. 2 illustrates a case in which one MBSFN sub-frame is inserted at 10 sub-frame intervals.

The MBSFN sub-frame is used for the purpose of being originally used in an MBSFN service of an LTE, but can be used for the purpose of transferring data between the donor base station and the relay base station.

A multicast (including broadcast) sub-frame may be used instead of the MBSFN sub-frame.

Also, the donor base station 501 communicates the mobile station 503 existing within the subject cell with the aid of a sub-frame other than the MBSFN sub-frame. One mobile station may use all or plural sub-frames, or the plural mobile stations may share the plural sub-frames.

The relay base station 504 receives the transmission signal DL-TXd transmitted from the donor base station 501 to obtain a downlink reception signal DL-RXr.

The relay base station 504 subjects the downlink reception signal DL-RXr to signal processing of each layer in the base station to obtain a downlink transmission signal DL-TXr.

The relay base station 504 transmits the downlink transmission signal DL-TXr toward the respective mobile stations 506 existing within the cell of the relay base station 504 by the aid of the sub-frames other than the MBSFN sub-frame.

Each mobile station 506 receives the downlink transmission signal DL-TXr transmitted from a relay femto base station to obtain a downlink reception signal DL-RXu.

On the other hand, each mobile station 506 transmits an uplink transmission signal up link (UL)-TXu of the C-plane and the U-plane with the aid of the sub-frames other than the MBSFN sub-frame.

The relay base station 504 receives the transmission signal UL-TXu transmitted from each mobile station 506, and subjects an uplink reception signal UL-RXr to signal processing of each layer in the base station to obtain an uplink transmission signal UL-TXr.

The relay base station 504 transmits the uplink transmission signal UL-TXr with the aid of the MBSFN sub-frame.

The donor base station 501 receives the transmission signal UL-TXr transmitted from the relay base station 504 to obtain an uplink reception signal UL-RXd.

The donor base station 501 subjects the uplink reception signal UL-RXd to signal processing of each layer in the base station to obtain uplink data of the C-plane and the U-plane.

The donor base station 501 transmits the uplink data of the C-plane and the U-plane to the core network 507 with the aid of the backhaul connection 508.

SUMMARY OF THE INVENTION

The base station of the LTE has an interface such as an X2 interface that connects the respective base station to each other in order to prevent interference between the cells whereas the femto base station has no interface such as the X2 interface. This leads to such a problem that it would be difficult to prevent the interference between the cells.

The interference between the cells means that a ratio of a signal to interference power is deteriorated by overlapping of signals from the neighborhood base stations on a frequency axis and on a time axis.

Also, relay specified in the 3GPP suffers from such a problem that a rate of the backhaul connection of the relay base station and the donor base station may be low.

Accordingly, service of the mobile station connected to the donor base station may be limited.

Also, the relay base station suffers from such a problem that the cell throughput of the donor base station is deteriorated because of the use of a radio resource of the donor base station.

The present invention aims at newly providing a relay femto base station having a relay function, and a femto cell radio system that solves the above problem.

The present invention has been made in view of the above problems, and therefore an object of the present invention is to prevent interference between base stations, such as interference between a macro base station and a femto base station, and interference between the femto base station and the femto base station.

Another object of the present invention is to provide a relay (femto) base station that obtains high throughput by a radio resource small in the number of donor (macro) base stations.

Still another object of the present invention is to save a battery of a mobile station with a reduction in a transmission power through a near field communication.

One configuration of the present invention includes a relay femto base station having a relay function, a donor macro base station having a donor function, a mobile station, and a core network, wherein the relay femto base station is located within a communication area of a donor macro cell formed by the donor macro base station, and the relay femto base station includes:

a unit that transfers data of a C-plane communicated between the core network and the mobile station through the donor macro base station with the aid of a radio connection;

a unit that transfers data of a U-plane through an internet connection with the aid of a wired public line;

a unit that measures an interfered power from a neighborhood relay femto base station, and notifies the donor macro base station of the measured interfered power; and a unit that adjusts radio packet scheduling so as to prevent interference between the relay femto base stations on the basis of a measured value of the interfered power notified the donor macro base station of from the relay femto base station.

According to the first solving means of the present invention, there is provided a radio system comprising: a donor base station and a relay base station in which the doner base station or the relay base station communicates with a mobile station by a radio signal, wherein the donor base station is connected to a core network by wire, receives, from the core network by wire, first control data for allowing the core network to communicate with the mobile station within a communication area of the relay base station or in the vicinity of an edge of the communication area, maps the first control data to a first sub-frame for the relay base station to generate and output downlink transmission data, the relay base station is connected to the core network through a backhaul connection by wire, and is located within a communication area of the donor base station or in the vicinity of an edge of the communication area, and connected to the donor base station by radio communication, the relay base station receives first user data corresponding to the first control data and for allowing the core network to communicate with the mobile station, from the core network through the backhaul connection, the relay base station maps the first user data transmitted from the backhaul connection to sub-frames other than the first sub-frame to generate downlink transmission data, according to scheduling information included in the first control data transmitted from the donor base station by radio communication, and transmits the downlink transmission data to the mobile station, wherein the first control data is transferred between the core network and the relay base station through the donor base station by using radio communication, and the first user data is transferred between the core network and the relay base station by using the wired backhaul connection.

According to the second solving means of the present invention, there is provided a communication method in a radio system comprising: a donor base station and a relay base station in which the doner base station or the relay base station communicates with a mobile station by a radio signal, wherein the donor base station is connected to a core network by wire, receives, from the core network by wire, first control data for allowing the core network to communicate with the mobile station within a communication area of the relay base station or in the vicinity of an edge of the communication area, maps the first control data to a first sub-frame for the relay base station to generate and output downlink transmission data, the relay base station is connected to the core network through a backhaul connection by wire, and is located within a communication area of the donor base station or in the vicinity of an edge of the communication area, and connected to the donor base station by radio communication, the relay base station receives first user data corresponding to the first control data and for allowing the core network to communicate with the mobile station, from the core network through the backhaul connection, the relay base station maps the first user data transmitted from the backhaul connection to sub-frames other than the first sub-frame to generate downlink transmission data, according to scheduling information included in the first control data transmitted from the donor base station by radio communication, and transmits the downlink transmission data to the mobile station, wherein the first control data is transferred between the core network and the relay base station through the donor base station by using radio communication, and the first user data is transferred between the core network and the relay base station by using the wired backhaul connection.

According to the present invention, the donor (macro) base station adjusts the radio packet scheduling of the relay (femto) base station, thereby being capable of preventing interference between the mobile stations, such as interference between the macro base station and the femto base station, and interference between the femto base station and the femto base station.

Also, a data packet of the U-plane in the relay (femto) base station is transmitted to the wired public line whereby the relay (femto) base station obtains a high throughput by the radio resource small in the number of donor (macro) base stations.

Further, since the mobile station communicates with the relay (femto) base station, the battery of the mobile station is saved by a reduction in the transmission power through the near field communication.

BRIEF DESCRIPTION OF THE DRAWINGS

FIG. 9 is a diagram illustrating a management table according to this embodiment.

DETAILED DESCRIPTION OF THE PREFERRED EMBODIMENTS

1. System

Figure 1:
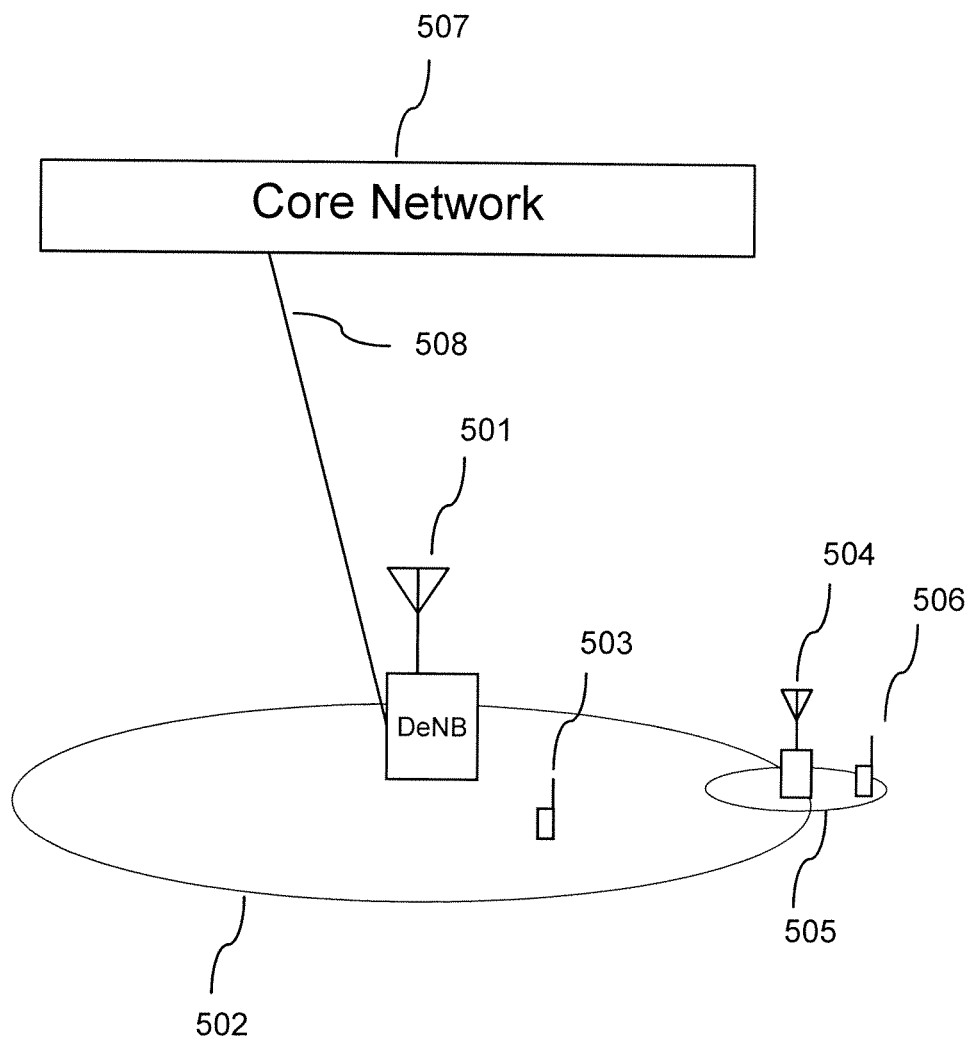
FIG. 1 is a diagram illustrating a configuration of a relay radio system in a conventional example.
Figure 2:
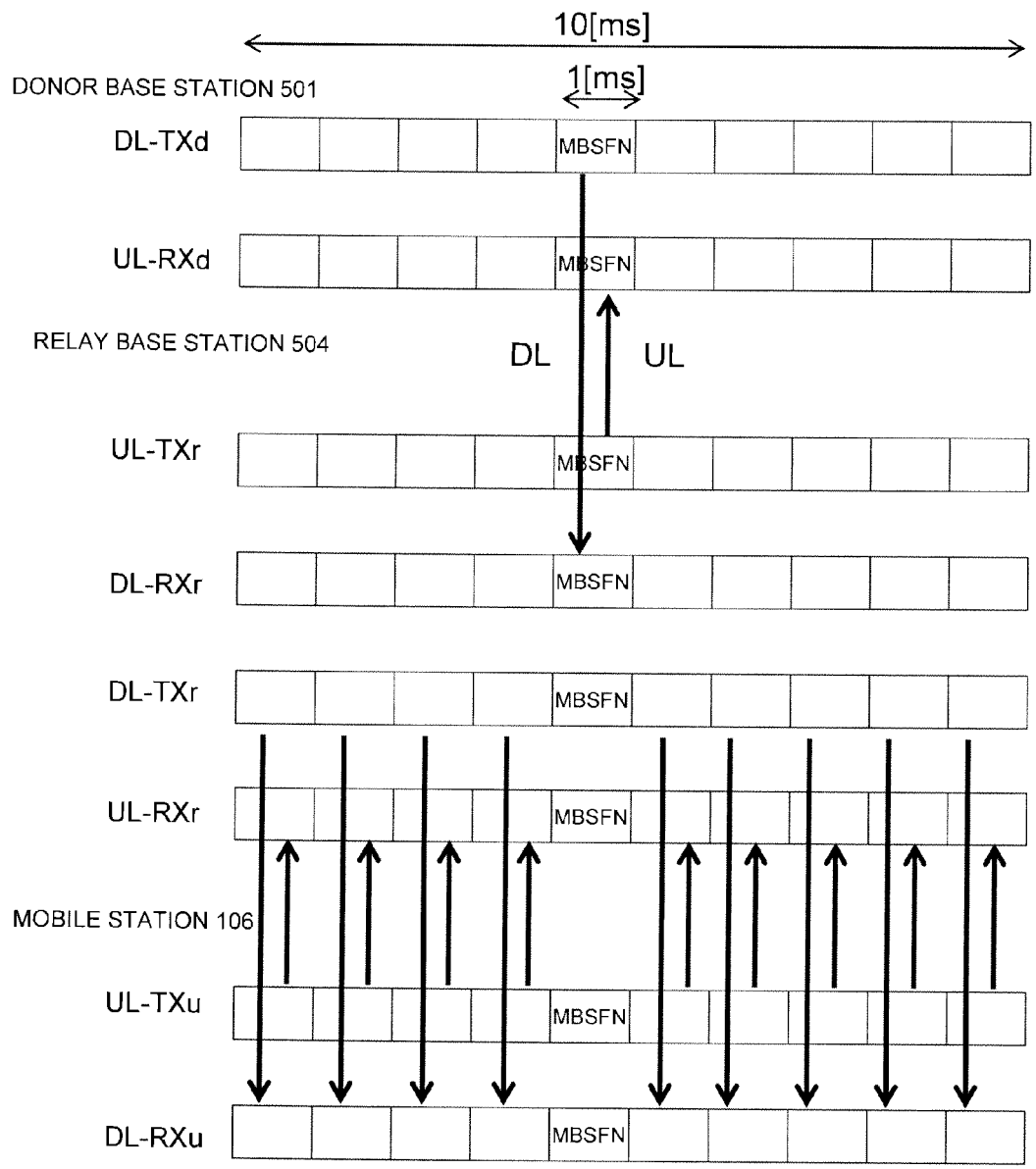
FIG. 2 is a diagram illustrating an appearance of data transfer in the conventional example.
Figure 3:
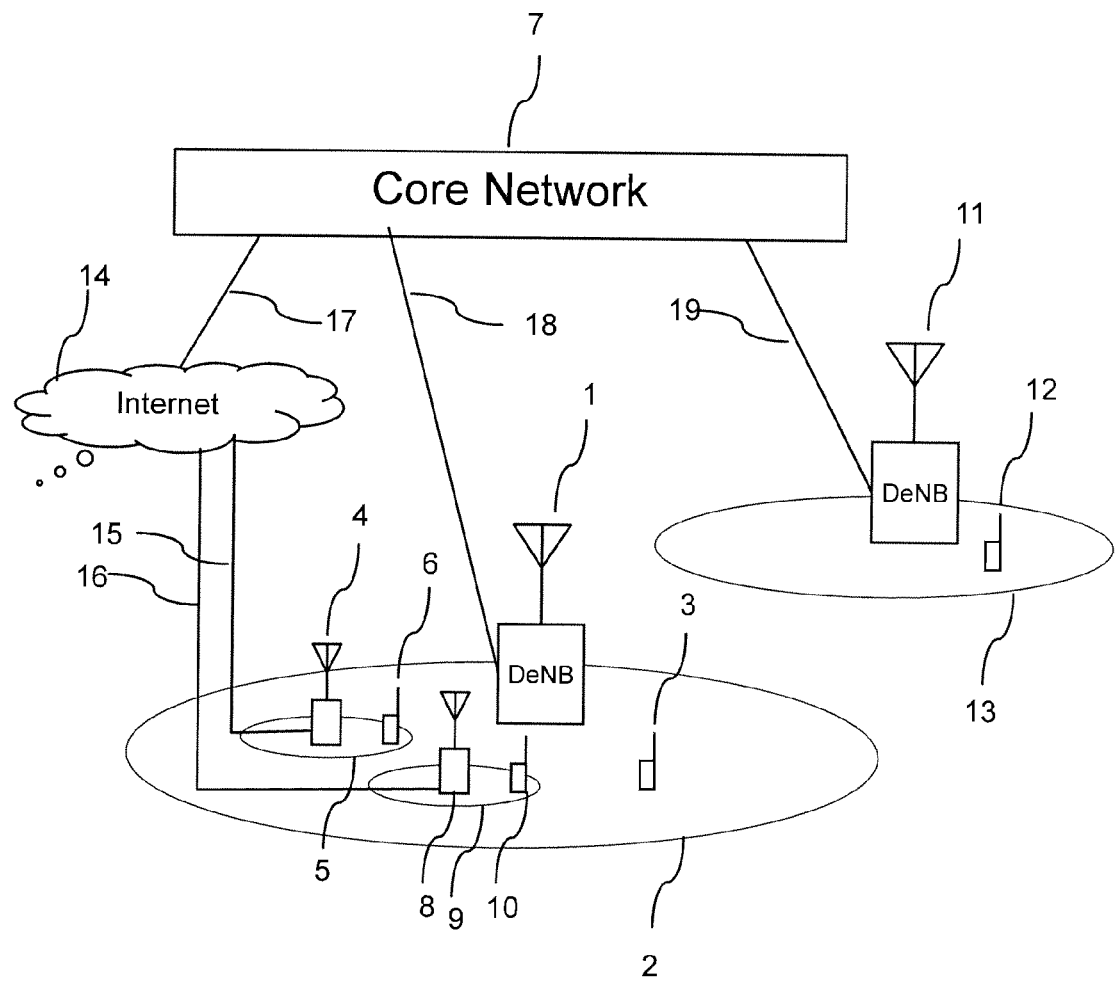
FIG. 3 is a diagram illustrating a configuration of a relay radio system according to an embodiment.

FIG. 3 illustrating a configuration diagram of a relay radio system according to an embodiment.

The relay radio system according to this embodiment includes a donor macro base station 1, a donor macro cell 2, a mobile station 3, a relay femto base station 4, a relay femto cell 5, a mobile station 6, a core network 7, a relay femto base station 8, a relay femto cell 9, a mobile station 10, a macro base station 11, and a mobile station 12.

It is assumed that the donor macro base station 1 forms the donor macro cell 2, the relay femto base station 4 forms the relay femto cell 5, the relay femto base station 8 forms the relay femto cell 9, and the macro base station 11 forms a macro cell 13.

The relay femto base station 4 and the relay femto base station 8 according to this embodiment are located within a communication area (or in the vicinity of an edge) of the donor macro cell 2 formed by the donor macro base station 1, and exert the effect particularly when those base stations 4 and 8 are located within a building or a home.

It is needless to say that the donor macro base station 1, the macro base station 11, and the relay femto base stations 4 and 8 are available regardless of indoor, outdoor, a cell center, and a cell edge.

It is assumed that the mobile station 3 is located within the communication area of the donor macro cell 2 formed by the donor macro base station 1, the mobile station 6 is located within a communication area of the relay femto cell 5 formed by the relay femto base station 4, and the mobile station 10 is located within a communication area of the relay femto cell 9.

It is assumed that the donor macro base station 1 communicates with the mobile station 3, the relay femto base station 4, and the relay femto base station 8, and the relay femto base station 4 communicates with the mobile station 6, the relay femto base station 8, and the mobile station 10.

The donor macro base station 1 is connected to the core network 7 with the aid of a backhaul connection 18 of an operator dedicated connection by wire.

The macro base station 11 is connected to the core network 7 with the aid of a backhaul connection 19 of the operator dedicated connection by wire.

The relay femto base station 4 is connected to an internet 14 with the aid of a backhaul connection 15 of a public line by wire.

The relay femto base station 8 is connected to the internet 14 with the aid of a backhaul connection 16 of the public line by wire.

The relay femto base station 4 has a function of transferring data of a C-plane communicated between the core network 7 and the mobile station 6 through the donor macro base station 1 by a radio link.

The relay femto base station 8 has a function of transferring data of the C-plane communicated between the core network 7 and the mobile station 10 through the donor macro base station 1 by the radio link.

The relay femto base station 4 has a function of transferring data of a U-plane communicated between the core network 7 and the mobile station 6 through the internet 14 with the aid of the backhaul connection 15 of the wired public line.

The relay femto base station 8 has a function of transferring data of the U-plane communicated between the core network 7 and the mobile station 10 through the internet 14 with the aid of the backhaul connection 16 of the wired public line.

The data of the C-plane communicated between the core network 7 and the mobile stations 6, 10 means control data of transmission and reception.

The data of the U-plane communicated between the core network 7 and the mobile stations 6, 10 means real user data.

The data transfer between the donor macro base station 1 and the relay femto base station 4, and the data transfer between the donor macro base station 1 and the relay femto base station 8 are conducted by using a given specific sub-frame.

Figure 4:
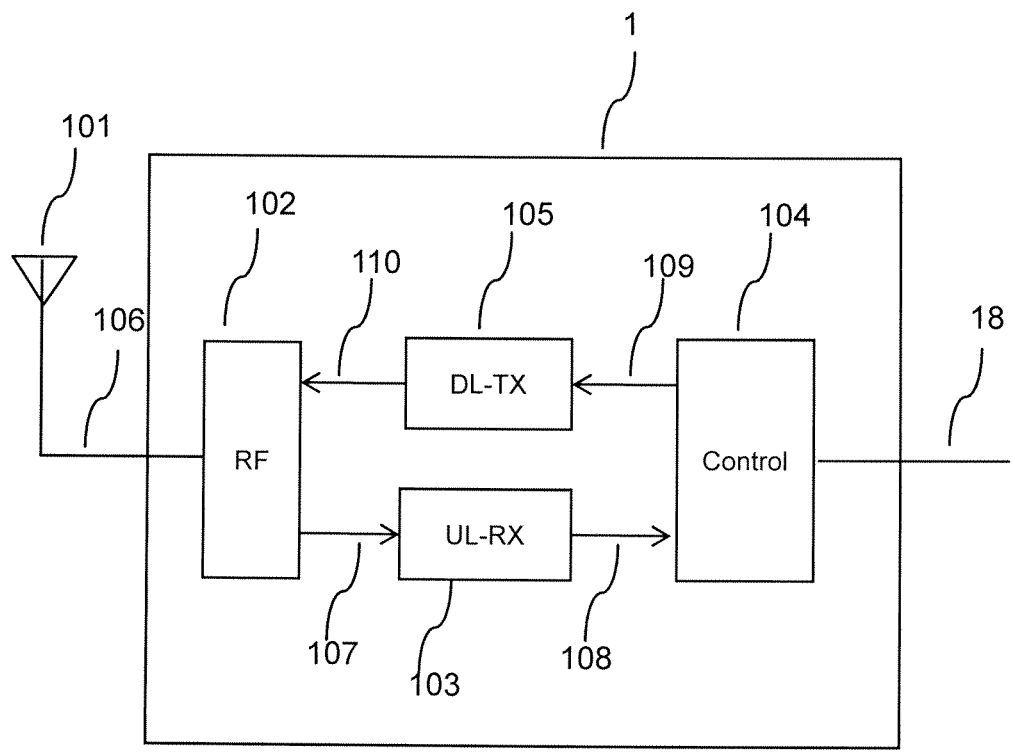
FIG. 4 is a diagram illustrating a configuration of a donor macro base station according to this embodiment.

FIG. 4 illustrates a configuration diagram of the donor macro base station 1.

The donor macro base station 1 includes an antenna 101, an RF unit 102, an uplink baseband receiver 103, a controller 104, and a downlink baseband transmitter 105.

The data of the U-plane and the data of the C-plane which are transmitted from the core network 7 through the backhaul connection 18 are input to the controller 104 of the donor macro base station 1.

The controller 104 converts the data of the U-plane and the data of the C-plane which are transmitted from the core network 7 into an input format of the downlink baseband transmitter 105, and outputs a downlink transmission data 109 to the downlink baseband transmitter 105.

The downlink baseband transmitter 105 subjects the downlink transmission data 109 transmitted from the controller 104 to given processing such as error correction encoding, modulation, and/or inverse fast Fourier transform (IFFT), and outputs a downlink transmission data 110 to the RF unit 102.

The RF unit 102 subjects the downlink transmission data 110 transmitted from the downlink baseband transmitter 105 to given processing such as quadrature modulation, frequency conversion, power amplification, and/or rate limiting, and outputs the downlink transmission signal 106 to the antenna 101.

On the other hand, the uplink reception signal 106 transmitted from the mobile station 3, and the relay femto base stations 4, 8 through the antenna 101 is input to the RF unit 102 of the donor macro base station 1.

The RF unit 102 subjects the uplink reception signal 106 transmitted from the antenna 101 to given processing such as rate limiting, low-noise amplification, frequency conversion, and/or quadrature demodulation, and outputs an uplink reception data 107 to the uplink baseband receiver 103.

The uplink baseband receiver 103 subjects the uplink reception data 107 transmitted from the RF unit 102 to given processing such as fast Fourier transform (FFT), demodulation, and/or error correction decoding, and outputs an uplink reception data 108 to the controller 104.

Figure 5:
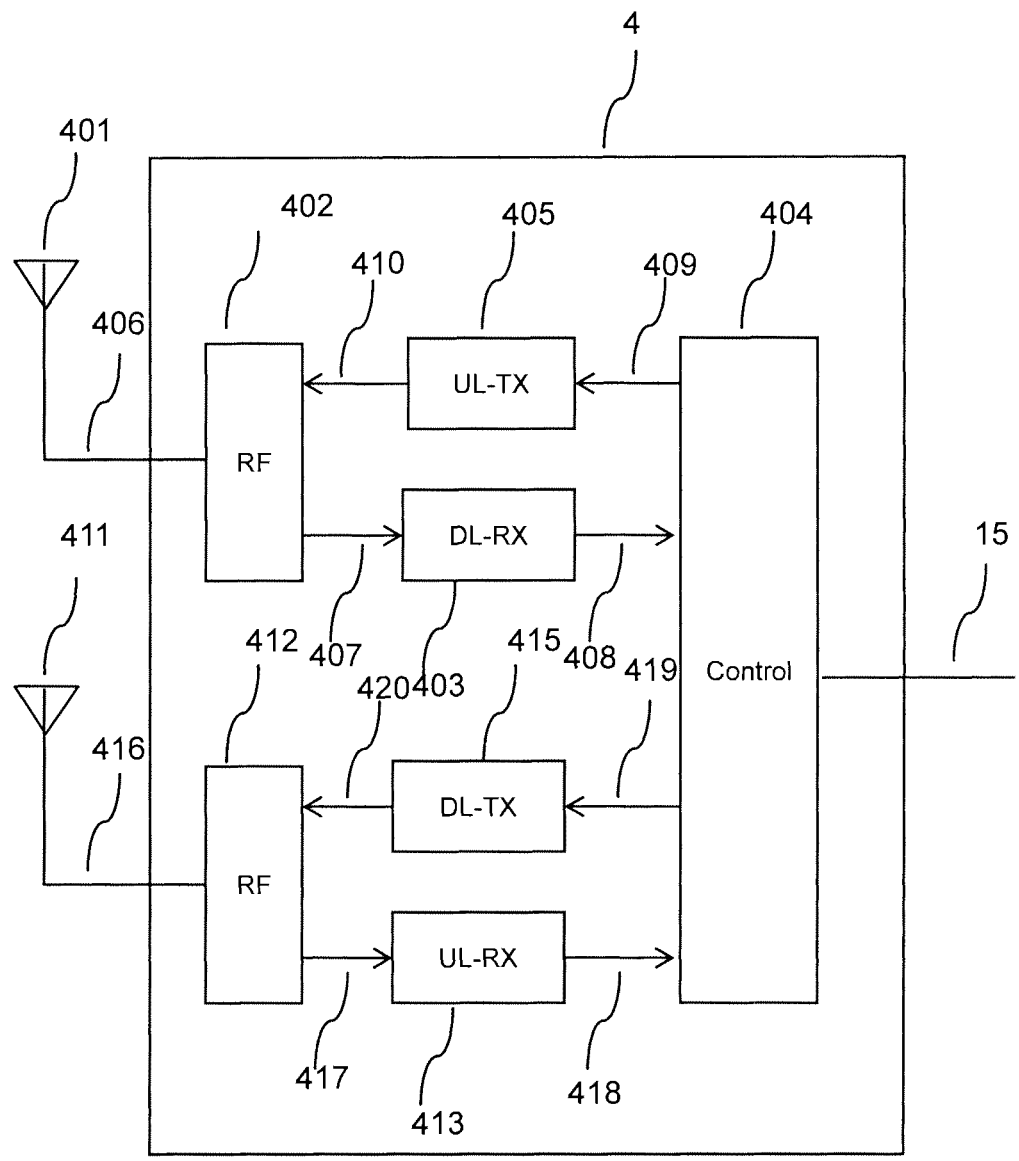
FIG. 5 is a diagram illustrating a configuration of a relay femto base station according to this embodiment.

FIG. 5 illustrates a configuration diagram of the relay femto base station 4.

The relay femto base station 4 includes antennas 401, 411, RF units 402, 412, a downlink baseband receiver 403, a controller 404, an uplink baseband transmitter 405, an uplink baseband receiver 413, a downlink baseband transmitter 415, and the backhaul connection 15.

A downlink reception signal 406 transmitted from the donor macro base station 1 through the antenna 401 is input to the RF unit 402.

The RF unit 402 subjects the downlink reception signal 406 transmitted from the antenna 401 to given processing such as rate limiting, low-noise amplification, frequency conversion, and/or quadrature demodulation, and outputs a downlink reception data 407 to the downlink baseband receiver 403.

The downlink baseband receiver 403 subjects the downlink reception data 407 transmitted from the RF unit 402 to FFT, demodulation, and error correction decoding, and outputs a downlink reception data 408 to the controller 404.

The controller 404 converts the downlink reception data 408 transmitted from the downlink baseband receiver 403 into an input format of the downlink baseband transmitter 415, and outputs a downlink transmission data 419 to the downlink baseband transmitter 415.

The downlink baseband transmitter 415 subjects the downlink transmission data 419 transmitted from the controller 404 to given processing such as error correction encoding, modulation, and/or IFFT, and outputs a downlink transmission data 420 to the RF unit 412.

The RF unit 412 subjects the downlink transmission data 420 transmitted from the downlink baseband transmitter 415 to given processing such as quadrature modulation, frequency conversion, power amplification, and/or rate limiting, and outputs a downlink transmission signal 416 to the antenna 411, and transmits the downlink transmission signal 416 toward the mobile station 6 existing in the area of the subject station.

On the other hand, an uplink reception signal 416 transmitted from the mobile station 6 through the antenna 411 is input to the RF unit 412 of the relay femto base station 4.

The RF unit 412 subjects the uplink reception signal 416 transmitted from the antenna 411 to given processing such as rate limiting, low-noise amplification, frequency conversion, and/or quadrature modulation, and outputs an uplink reception data 417 to the uplink baseband receiver 413.

The uplink baseband receiver 413 subjects the uplink reception data 417 transmitted from the RF unit 412 to given processing such as FFT, demodulation, and/or error correction decoding, and outputs an uplink reception data 418 to the controller 404.

The controller 404 converts the uplink reception data 418 transmitted from the uplink baseband receiver 413 into an input format of the uplink baseband transmitter 405, and outputs an uplink transmission data 409 to the uplink baseband transmitter 405.

The uplink baseband transmitter 405 subjects the uplink transmission data 409 transmitted from the controller 404 to given processing such as error correction encoding, modulation, and/or IFFT, and outputs an uplink transmission data 410 to the RF unit 402.

The RF unit 402 subjects the uplink transmission data 410 transmitted from the uplink baseband transmitter 405 to given processing such as quadrature modulation, frequency conversion, power amplification, and/or rate limiting, and outputs an uplink transmission signal 406 to the antenna 401, and transmits the uplink transmission signal 406 toward the donor macro base station 1.

2. Data Transfer

Figure 6:
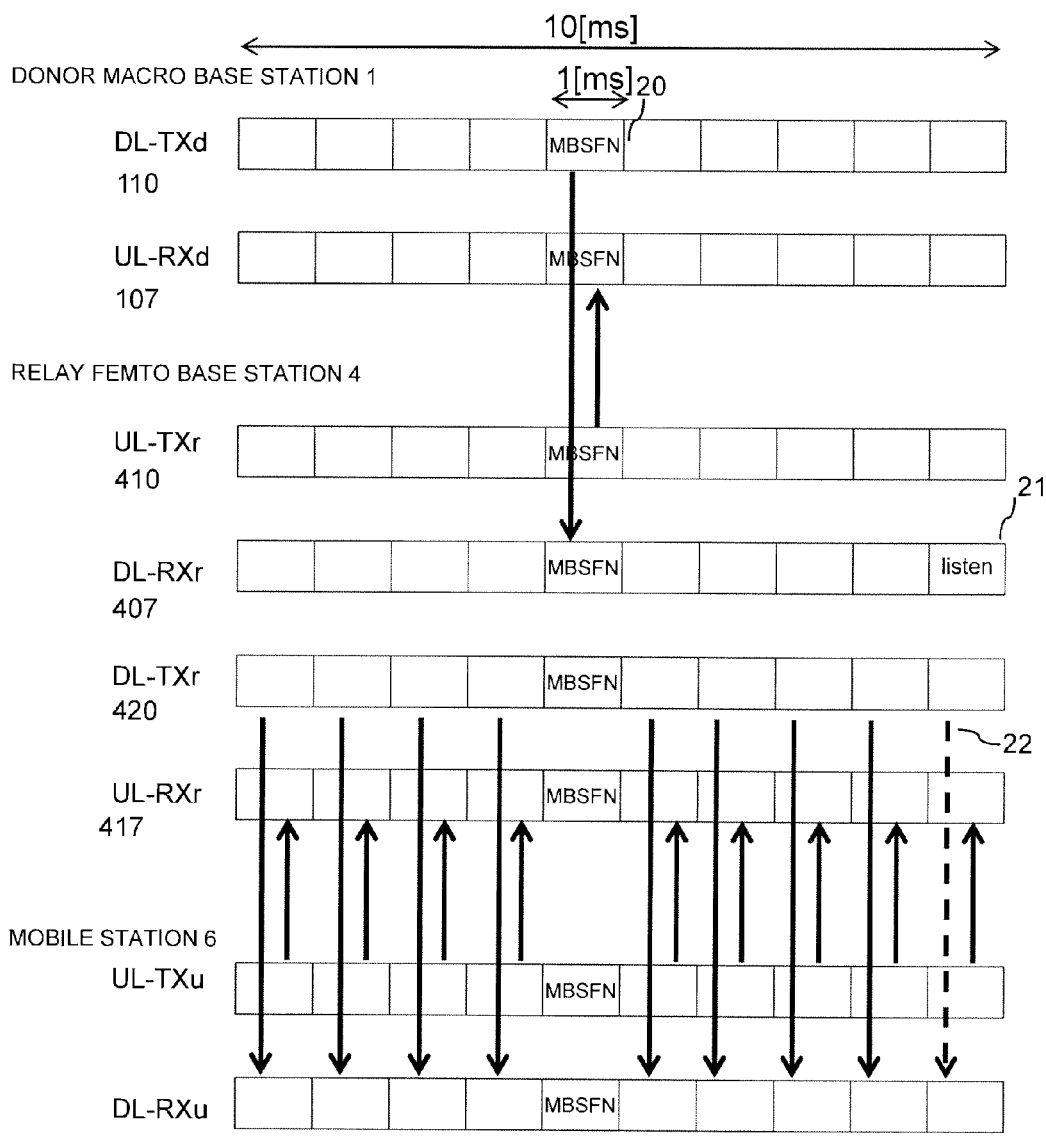
FIG. 6 is a diagram illustrating an appearance of data transfer according to this embodiment.

FIG. 6 illustrates an appearance of data transfer among the donor macro base station 1, the relay femto base station 4, and the mobile station 6. Hereinafter, the operation in FIGS. 4 and 5 will be described in detail with reference to FIG. 6.

The donor macro base station 1 receives the data of the U-plane and the data of the C-plane which are transmitted from the core network 7 through the backhaul connection 18. The downlink baseband transmitter 105 maps only the data of the C-plane to an MBSFN sub-frame 20 for the relay femto base station 4, maps the data of the U-plane and the data of the C-plane for the mobile station 6, and outputs the downlink transmission data 110 to the RF unit 102.

In this example, the sub-frame means a data interval having a given period, for example, 1 [ms], and the MBSFN sub-frame means each specific sub-frame which is inserted into a given number of sub-frame intervals, for example, 10 sub-frames. FIG. 6 illustrates a case in which one MBSFN sub-frame is inserted at each 10 sub-frame interval.

The MBSFN sub-frame is used for the purpose of being originally used in an MBSFN service of an LTE, but can be used for the purpose of transferring data between the donor base station and the relay base station. A multicast (including broadcast) sub-frame may be used instead of the MBSFN sub-frame.

Accordingly, the donor macro base station 1 communicates with the relay femto base station 4 with the aid of the MBSFN sub-frame, and communicates the mobile station 6 existing within the subject cell with the aid of the sub-frames other than the MBSFN sub-frame. One mobile station may use all or plural sub-frames, or the plural mobile stations may share the plural sub-frames.

The relay femto base station 4 receives the downlink transmission data DL Txd 110 of the C-plane transmitted from the downlink baseband transmitter 105 of the donor macro base station 1 to obtain the downlink reception data DL-RXr 407. Also, the relay femto base station 4 receives the data of the U-plane transmitted from the core network 7 through a backhaul connection 17, the internet 14, and the backhaul connection 15 by the controller 104.

The relay femto base station 4 receives the downlink reception signal DL-RXr 407 transmitted from the donor macro base station 1 through the downlink baseband receiver 403, and maps the data of the U-plane transmitted from the backhaul connection 15 to the sub-frames other than the MBSFN sub-frame 20 according to scheduling information included in the data of the C-plane transmitted from the donor macro base station 1 by the controller 404. Then, the relay femto base station 4 transmits the downlink transmission data DL-TXr 420 to the mobile station 6 through the downlink baseband transmitter 415.

The mobile station 6 receives the downlink transmission data DL-TXr 420 of the U-plane and the C-plane transmitted from the relay femto base station 4 to obtain downlink reception data DL-RXu.

On the other hand, the mobile station 6 maps uplink transmission data UL-TXu of the U-plane and the C-plane to the sub-frames other than the MBSFN sub-frame according to the scheduling information included in the data of the C-plane transmitted from the relay femto base station 4, and transmits the mapped data.

The relay femto base station 4 receives the uplink transmission data UL-Txu of the U-plane and the C-plane, which is transmitted from the mobile station 6, to obtain the uplink reception data UL-RXr 417.

The relay femto base station 4 transmits the uplink reception data UL-RXr 417 transmitted from the mobile station 6 to the controller 404 through the uplink baseband receiver 413. The relay femto base station 4 transmits the data of the U-plane to the backhaul connection 15, and maps the data of the C-plane to the MBSFN sub-frame, both of the data are transmitted from the mobile station 6 through the controller 404. Then, the relay femto base station 4 transmits the uplink transmission data UL-TXr 410 to the donor macro base station 1 through the uplink baseband transmitter 405.

The donor macro base station 1 receives the uplink transmission data UL-TXr 410 of the C-plane transmitted from the uplink baseband transmitter 405 in the relay femto base station 4 to obtain the uplink reception signal UL-RXd 107.

The donor macro base station 1 receives the uplink reception data UL-RXd 107 transmitted from the relay femto base station 4 by a radio communication through the uplink baseband receiver 103. The donor macro base station 1 transmits the data of the C-plane transmitted from the relay femto base station 4 to the core network 7 with the aid of the backhaul connection 18 by the controller 104.

Data transfer is also conducted between the donor macro base station 1 and the relay femto base station 8 in the same manner as that described above.

3. Interference Prevention

Subsequently, interference prevention according to this embodiment will be described in detail with reference to FIGS. 5 and 7.

Figure 7:
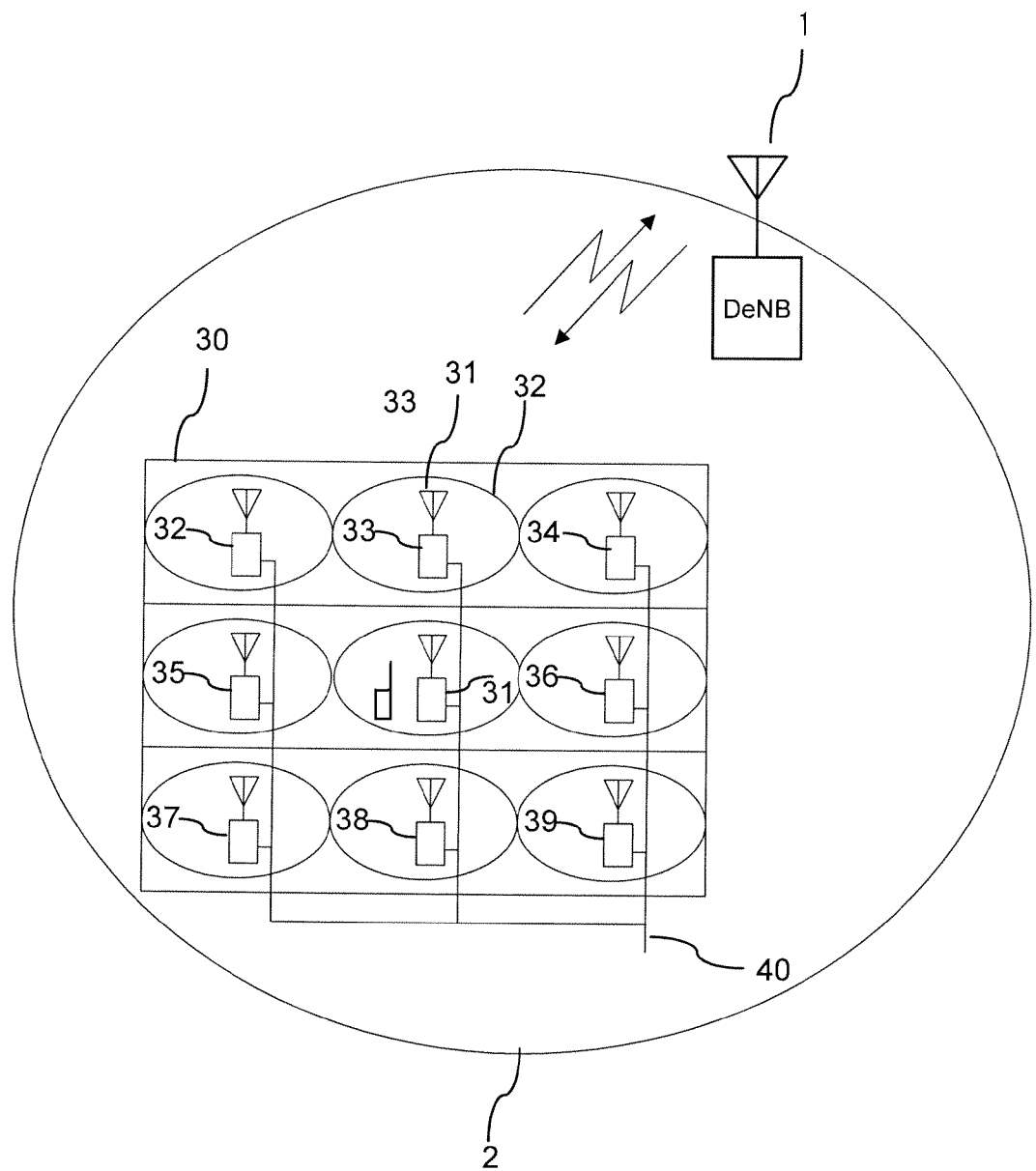
FIG. 7 is a diagram illustrating an appearance in which the relay femto base station is installed within a building according to this embodiment.

FIG. 7 is a diagram illustrating that nine relay femto base stations each form a relay femto cell inside a building 30 located within a communication area of a donor macro cell formed by the donor macro base station 1.

All of nine relay femto base stations 31 to 39 illustrated in FIG. 7 are located within the communication area of the donor macro cell 2 formed by the donor macro base station 1.

Since only the data of the C-plane is transferred between the donor macro base station 1 and the respective relay femto base stations 31 to 39, the amount of data to be transferred can be remarkably reduced as compared with the conventional example.

Because a low transfer rate is kept as compared with the conventional example, a high communication quality is not required as compared with the relay base station to which the data of the C-plane and the U-plane is transferred in the conventional example.

For example, a modulation and coding scheme (MCS) may be set to a low value. When the MCS is low, if a modulation system is, for example, QPSK, a code rate is as small as ¼.

That is, this means that there is a high possibility that communication can be conducted even in indoor low radio wave environments.

The relay femto base stations 31 to 39 are configured by the same base stations as the relay femto base station 4.

In this example, the relay femto base station 31 has a function of measuring interfered powers from the neighboring relay femto base stations 32 to 39 located inside the building 30 on a given unit.

The given unit for measuring the interfered power may be configured by a resource block (RB) which is, for example, an assembly of about 12 sub-carriers.

Likewise, the relay femto base station 32 has a function of measuring interfered powers from the relay femto base stations 31, and 33 to 39 on a given unit. The same is applied to the other relay femto base stations 33 to 39.

Hereinafter, the relay femto base station 31 will be described as an example.

The relay femto base station 31 measures the interfered power with the aid of a listen sub-frame 21 illustrated in FIG. 6.

In the present specification, the sub-frame that measures the interfered power from the neighboring relay femto base stations 32 to 39 is called "listen sub-frame 21".

Since the relay femto base station 31 has the downlink baseband receiver 403 that receives the downlink transmission data DL-TXr, the relay femto base station 31 can receive the downlink transmission data DL-TXr transmitted from the neighboring relay femto base stations 32 to 39.

The downlink baseband receiver 403 of the relay femto base station 31 measures a signal power of a Reference Signal (RS signal) included in the downlink transmission data DL-TXr transmitted from the neighboring relay femto base stations 32 to 39, thereby enabling the interfered power to be measured. The RS signal includes or being added with an ID of the relay femto base station so as to be identifiable.

The interfered power is specifically obtained by calculating a ratio of reception power values or a total of those reception power values of the RS signals transmitted from the neighboring relay femto base stations 32 to 39 to the RS power transmitted from the relay femto base stations 31.

Since the relay femto base station 31 uses the MBSFN sub-frame for data transmission to the donor macro base station 1, the sub-frames other than the MBSFN sub-frame become in an idle state. As a result, the relay femto base station 31 can measure the interfered power.

In the listen sub-frame 21 that measures the interfered power from the neighboring relay femto base stations 32 to 39, it is desirable to conduct transmission stop 22 of the downlink transmission data DL-TXr 420 of the relay femto base station 31.

The same operation as that of the relay femto base station 31 is applied to the relay femto base stations 32 to 39.

Figure 8:
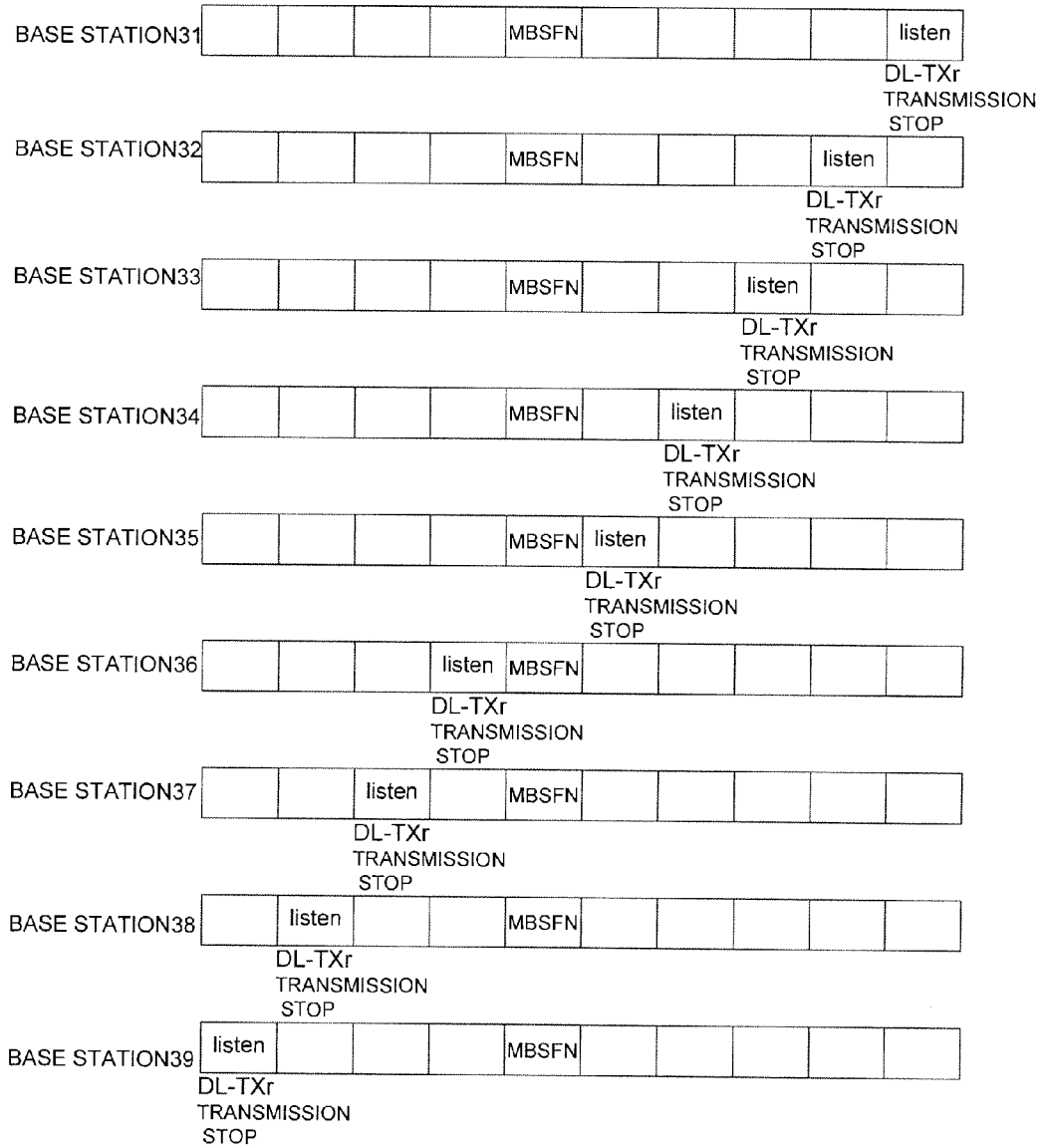
FIG. 8 is a diagram illustrating an appearance of a listen sub-frame of each relay femto base station according to this embodiment.

Also, FIG. 8 is a diagram illustrating an appearance of the listen sub-frame of each relay femto base station according to this embodiment. The listen sub-frames of the respective relay femto base stations 31 to 39 are predetermined so as not to be overlapped among the relay femto base stations 31 to 39 as illustrated in FIG. 8.

As with the transmission stop 22 of the downlink transmission data DL-TXr 420 in the listen sub-frame of the relay femto base station 31, the transmission of the downlink transmission data DL-TXr 420 is also stopped in the listen sub-frames of the relay femto base stations 32 to 39.

The relay femto base station 31 includes the interfered power measured by using the listen sub-frame 21 in the uplink transmission data UL-TXr 410, and notifies the donor macro base station 1 of the measured interfered power with the aid of the MBSFN sub-frame. The contents to be notified can include an ID of the relay femto base station 31, IDs of the relay femto base stations 32 to 39, and the interfered powers thereof.

The donor macro base station 1 has a function of adjusting a radio packet scheduling so as to prevent interference between the relay femto base stations on the basis of an interfered power value notified of from the relay femto base station 31.

The function of adjusting the radio packet scheduling so as to prevent the interference between the relay femto base stations is a function of notifying the relay femto base station 4 of the radio packet scheduling information for preventing the relay femto base station 31 from overlapping on the frequency axis and the time axis with the neighboring relay femto base stations that are determined to give interference according to the interfered power value notified the donor macro base station 1 of from the relay femto base station 31.

A criterion for determining interfering is that the interfered power value measured by the relay femto base station exceeds a given threshold value.

FIG. 9 illustrates an example of a management table of the relay femto base station determined to give interference on the basis of the interfered power value notified of from the relay femto base stations 31 to 39.

The management table illustrated in FIG. 9 allocates ID Nos. to the respective relay femto base stations 31 to 39, and manages the ID of the relay femto base station determined to given interference for each of the relay femto base stations that suffer interference.

The donor macro base station 1 includes the management table illustrated in FIG. 9, includes, in the downlink transmission data DL-TXd, the radio packet scheduling information for adjusting the radio packet scheduling so as to prevent interference with the relay femto base station giving interference on the basis of the management table. The donor macro base station 1 notifies the relay femto base station 31 of the radio packet scheduling information with the aid of the MBSFN sub-frame.

"The radio packet scheduling so as to prevent interference with the relay femto base station giving interference" means scheduling so as not to overlap the scheduling radio resources with each other on the frequency axis and the time axis.

In the data transfer of the C-plane, the relay femto base station 31 communicates with the mobile station 6 on the basis of the radio packet scheduling information notified of from the donor macro base station 1.

In the data transfer of the U-plane, the relay femto base station 31 conducts a normal communication method of the internet connection through no donor macro base station 1, and therefore its description will be omitted.

The relay femto base station 31 is connected to the core network 7 through the internet 14 with the aid of a wired public line 40, and the data of the U-plane communicated between the core network 7 and the mobile station 6 is transferred through the internet 14.

4. Advantages

According to the present invention and this embodiment, the following advantages can be expected.

According to the present invention and this embodiment, the relay femto base station measures the interfered power from the neighboring relay femto base stations, and the donor macro base station adjusts the radio packet scheduling on the basis of the interfered power notified of from the relay femto base station. As a result, interference between the relay femto base stations is prevented.

Also, only the data of the C-plane is transferred between the donor macro base station 1 and the relay femto base station 31, and the data of the U-plane is transferred through the internet. Therefore, an effect of the traffic offload is obtained.

It is assumed that the amount of data of the U-plane is several times to several dozen times as large as the amount of data of the C-plane.

The donor macro base station 1 can turn on/off (sleep) the power of the relay femto base stations 31 to 39.

Also, because the donor macro base station 1 can grasp terminals connected to the relay femto base stations 31 to 39, the positions of the mobile stations can be detected on a relay femto cell basis.

According to the present invention and this embodiment, the relay femto base station can be easily installed or removed without turning on/off or resetting the power of the donor macro base station 1.

Also, the relay femto base station receives the downlink transmission signal DL-TXd of the donor macro base station, and synchronizes with the frame timing of the downlink transmission signal DL-TXd of the donor macro base station, thereby making unnecessary an additional circuit necessary for synchronization such as a GPS or an IEEE 1588.

In FIG. 3 the donor macro base station 1 communicates with two stations of the relay femto base station 4 and the relay femto base station 8. However, the donor macro base station can also communicate with three or more relay femto base stations.

The donor macro cell may be, for example, a micro cell or a pico cell other than the macro cell.

The relay femto cell may be, for example, the pico cell other than the femto cell.

What is claimed is:

1. A radio system comprising: a donor base station and a relay base station in which the donor base station or the relay base station are configured to communicate with a mobile station by a radio signal, wherein the donor base station is connected to a core network by a first wire link, and is configured to receive, from the core network by the first wire link, first data of a C-plane, for allowing the core network to communicate with the mobile station within a communication area of the relay base station or in the vicinity of an edge of the communication area of the relay base station, and map the first data of the C-plane to a first sub-frame;

the relay base station is connected to the core network by a second wire link, and is located within a communication area of the donor base station or in the vicinity of an edge of the communication area of the donor base station, and connected to the donor base station by a first radio link;

the relay base station is configured to receive the first data of the C-plane transmitted by using the first radio link, and receive data of a U-plane, corresponding to the first data of the C-plane by using the second wire link from the core network;

the relay base station is configured to transmit the first data of the C-plane transmitted by using the first radio link from the donor base station and first data of the U-plane transmitted by using the second wire link from the core network to the mobile station by using a second radio link, wherein the first data of the C-plane are transferred between the core network and the relay base station through the donor base station by using the first radio link, and the first data of the U-plane are transferred between the core network and the relay base station by using the second wire link;

the relay base station has a function of measuring interfered power from one or a plurality of neighboring relay base stations; and the relay base station is configured to measure a signal power of a reference signal transmitted from the one or the plurality of neighboring relay base stations by using a second sub-frame other than the first sub-frame for measuring the interfered power, wherein the second sub-frames of the one or the plurality of neighboring relay base stations are predetermined so as not to overlap among the one or the plurality of neighboring relay base stations.

2. The radio system according to claim 1, wherein,
for second data of the U-plane and second data of the C-plane which are transmitted from the mobile station, the relay base station is configured to transfer the second data of the U-plane to the core network by using the second wire link, and to map the second data of the C-plane to the first sub-frame and to transmit the second data of the C-plane to the donor base station, and the donor base station is configured to transfer the second data of the C-plane transferred from the relay base station by the first radio link to the core network by the first wire link.

3. The radio system according to claim 1, wherein
the first sub-frame includes one of a multicast broadcast over single-frequency network (MBSFN) sub-frame, a multicast sub-frame, and a broadcast sub-frame.

4. The radio system according to claim 1, wherein,
for a mobile station located within the communication area of the donor base station or in the vicinity of the edge of the communication area of the donor base station, the donor base station is configured to receive third data of the U-plane and third data of the C-plane transmitted from the core network by the first wire link, to map the third data of the U-plane and the third data of the C-plane, and to output downlink transmission data to the mobile station.

5. The radio system according to claim 1, wherein
the relay base station is configured to notify the donor base station of the measured interfered power from another one or the plurality of relay base stations, the donor base station is configured to adjust a radio packet scheduling so as to prevent interference between the relay base stations on the basis of the measured value of the interfered power notified of from the relay base station, the donor base station is configured to notify the relay base station of information on the radio packet scheduling included in the first data of the C-plane by using the first radio link, and the relay base station is configured to communicate with the mobile station within a cell on the basis of the information on the radio packet scheduling included in the first data of the C-plane from the donor base station.

6. The radio system according to claim 1, wherein,
in the second sub-frame for measuring the interfered power from the one or the plurality of neighboring relay base stations, the transmission of the downlink transmission data of the relay base station is stopped.

7. The radio system according to claim 1, wherein
the donor base station includes a management table configured to store identification information on the relay base stations determined to give interference for each of the relay base stations that suffers interference with respect to the identification information on the respective relay base stations, the donor base station is configured to include information on the radio packet scheduling for adjusting the radio packet scheduling so as to prevent interference with one or a plurality of relay base stations configured to give interference on the basis of the management table in the first data of the C-plane, and notify the relay base station of the information on the radio packet scheduling, and the relay base station is configured to communicate with the mobile station on the basis of the information on the radio packet scheduling included in the first data of the C-plane from the donor base station.

8. A communication method in a radio system comprising:
communicating, using a donor base station or a relay base station, with a mobile station by a radio signal;

receiving, using the donor base station, which is connected to a core network by a first wire link, from the core network by the first wire link, first data of a C-plane, for allowing the core network to communicate with the mobile station within a communication area of the relay base station or in the vicinity of an edge of the communication area of the relay base station, wherein the relay base station is connected to the core network by a second wire link, and is located within a communication area of the donor base station or in the vicinity of an edge of the communication area of the donor base station, and connected to the donor base station by a first radio link;

mapping, using the donor base station, the first data of the C-plane to a first sub-frame;

receiving, using the relay base station, the first data of the C-plane transmitted by using the first radio link, and receiving data of a U-plane, corresponding to the first data of the C-plane by using the second wire link, from the core network;

transmitting, using the relay base station, the first data of the C-plane transmitted by using the first radio link from the donor base station and first data of the U-plane transmitted by using the second wire link from the core network to the mobile station by using a second radio link, wherein the first data of the C-plane are transferred between the core network and the relay base station through the donor base station by using the first radio link, and the first data of the U-plane are transferred between the core network and the relay base station by using the second wire link, wherein the relay base station has a function of measuring interfered power from one or a plurality of neighboring relay base stations; and measuring, using the relay base station, a signal power of a reference signal transmitted from the one or the plurality of neighboring relay base stations by using a second sub-frame other than the first sub-frame for measuring the interfered power, wherein the second sub-frames of the one or the plurality of neighboring relay base stations are predetermined so as not to overlap among the one or the plurality of neighboring relay base stations.

9. The communication method according to claim 8, further comprising:

for second data of the U-plane and second data of the C-plane which are transmitted from the mobile station, using the relay base station to transfer the second data of the U-plane to the core network by using the second wire link, to map the second data of the C-plane to the first sub-frame and to transmit the second data of the C-plane to the donor base station, and transferring, using the donor base station, the second data of the C-plane transferred from the relay base station by the first radio link to the core network by the first wire link.

10. The communication method according to claim 8, wherein the first sub-frame includes one of a multicast broadcast over single-frequency network (MBSFN) sub-frame, a multicast sub-frame, and a broadcast sub-frame.

11. The communication method according to claim 8, further comprising:

for a mobile station located within the communication area of the donor base station or in the vicinity of the edge of the communication area of the donor base station, using the donor base station, receiving third data of the U-plane and third data of the C-plane transmitted from the core network by the first wire link, mapping the third data of the U-plane and the third data of the C-plane, and outputting downlink transmission data to the mobile station.

12. The communication method according to claim 8, further comprising:

notifying, using the relay base station, the donor base station of the measured interfered power from another one or the plurality of relay base stations, adjusting, using the donor base station . . . on the basis of the measured value of the interfered power notified of from the relay base station, notifying, using the donor base station, the relay base station of information on the radio packet scheduling included in the first data of the C-plane by using the first radio link, and communicating, using the relay base station, with the mobile station within a cell on the basis of the information on the radio packet scheduling included in the first data of the C-plane from the donor base station.

13. The communication method according to claim 8, wherein, in the second sub-frame for measuring the interfered power from the one or the plurality of neighboring relay base stations, the transmission of the downlink transmission data of the relay base station is stopped.

14. The communication method according to claim 8, further comprising:

storing, using a management table in the donor base station identification information on the relay base stations determined to give interference for each of the relay base stations that suffers interference with respect to the identification information on the respective relay base stations, including, using the donor base station, information on the radio packet scheduling for adjusting the radio packet scheduling so as to prevent interference with one or a plurality of relay base stations that give interference on the basis of the management table in the first data of the C-plane, and notifying the relay base station of the information on the radio packet scheduling, and communicating, using the relay base station, with the mobile station on the basis of the information on the radio packet scheduling included in the first data of the C-plane from the donor base station.

\* \* \* \* \*